A. J. MORSE.
TRANSMISSION GEARING.
APPLICATION FILED JUNE 6, 1907.

954,453.

Patented Apr. 12, 1910.
2 SHEETS—SHEET 1.

FIG. 1.

FIG. 2.

WITNESSES
Frederick A. Blount.
Augusta E. Muir

INVENTOR
A. J. Morse
BY
G. W. H. Benjamin
ATTORNEY

A. J. MORSE.
TRANSMISSION GEARING.
APPLICATION FILED JUNE 6, 1907.
954,453.
Patented Apr. 12, 1910.
2 SHEETS—SHEET 2.
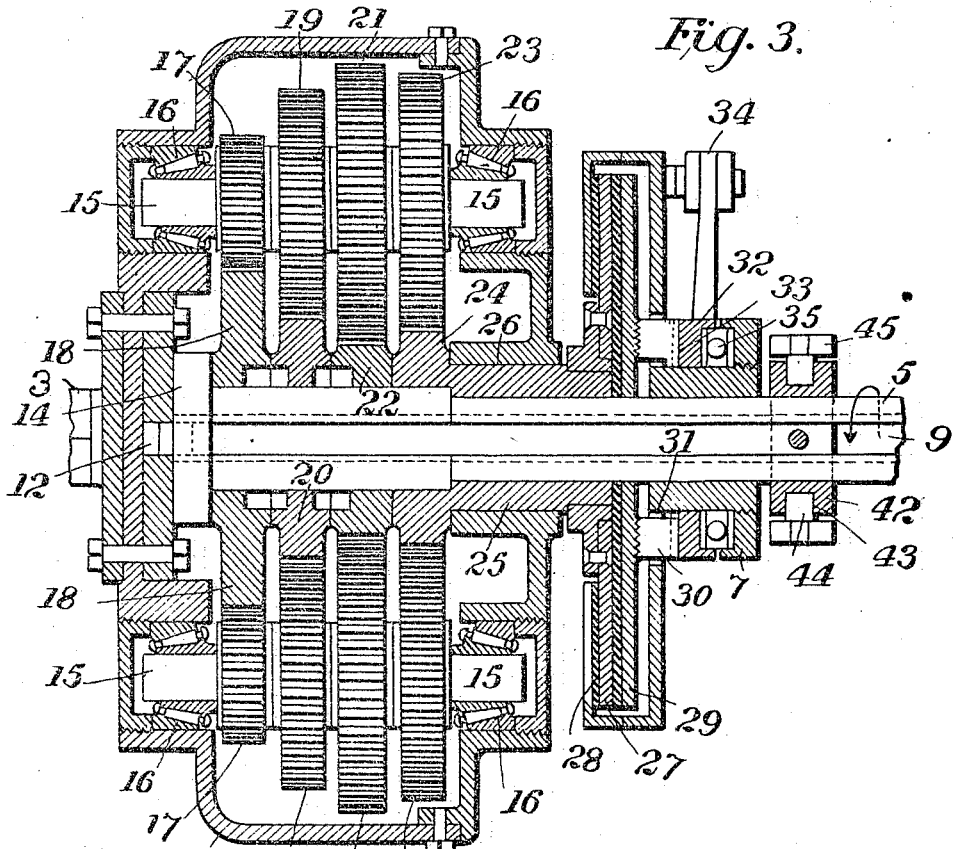
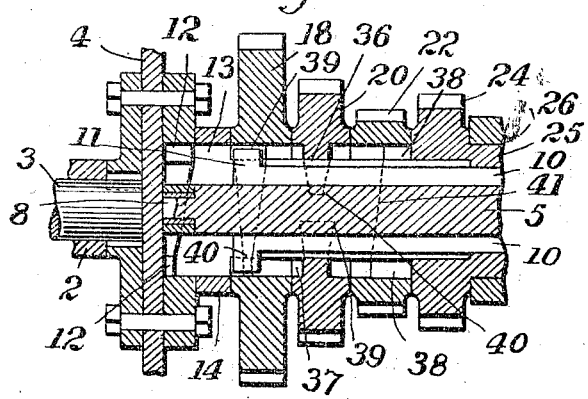
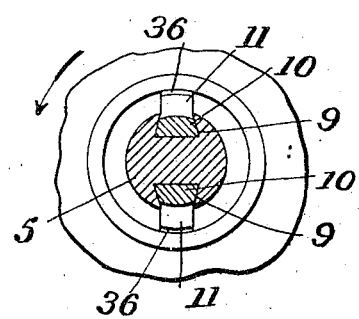
Witnesses
J. G. Stinkel
Charles N. Murray.
Inventor
A. J. Morse.
by
Geo. H. Benjamin
Attorney

UNITED STATES PATENT OFFICE.

ARTHUR JACOB MORSE, OF TORRINGTON, CONNECTICUT, ASSIGNOR TO CONNECTICUT MOTOR VEHICLE COMPANY, OF NEW YORK, N. Y., A CORPORATION OF NEW YORK.

TRANSMISSION-GEARING.

954,453.

Specification of Letters Patent.   Patented Apr. 12, 1910.

Application filed June 6, 1907.   Serial No. 377,596.

*To all whom it may concern:*

Be it known that I, ARTHUR JACOB MORSE, a citizen of the United States, residing at Torrington, county of Litchfield, State of Connecticut, have invented certain new and useful Improvements in Transmission-Gearing, of which the following is a specification.

My invention relates to transmission gearing and is especially applicable to motor vehicles designed to carry heavy loads, although it is applicable to any type of motor vehicles.

My invention consists: First: in the mechanism by reason of which the speed changing mechanism is thrown into connection with the drive shaft, whereby any speed forward or backward for the vehicle may be obtained. Second: in the arrangement of the speed changing mechanism in the fly wheel. Third: in the arrangement of a sliding pin and co-acting gears, with specially shaped slots.

The general purpose of my invention is to provide means for utilizing the power mechanism of the engine to obtain any speed forward or backward without operating a clutch prior to change of gears, and without shifting the gears relative to each other and the drive shaft.

The above statement of invention is sufficient to convey the general principles involved. I wish it understood, however, that in enumerating the features of invention and the objects to be obtained, I have treated the matter from a broad standpoint and without enumerating very many features and objects, which will be apparent from an examination of the detailed specification.

In the accompanying drawings: Figure 1, is a longitudinal view partly in section, showing my improved transmission gearing connected to an engine shaft. Fig. 2, is a cross-section on the line II—II of Fig. 1; Fig. 3, is a longitudinal section of my gearing mounted within a fly-wheel; Fig. 4 is a longitudinal section of a clutch coupling to the drive-shaft; and Fig. 5 is a cross-section, of the clutch coupling shown in Fig. 4.

For the purpose of illustrating my transmission gearing and its mode of operation, I have shown diagrammatically a gasolene engine A, supported from a platform 1, which may be the frame of a motor car, and secured to the under side of said frame, a bearing 2 for the engine shaft 3. The engine extends transversely of the frame so that the shaft and gearing may extend longitudinally thereof.

I will first describe my invention in connection with the arrangement shown in Figs. 3, 4, and 5. To the engine shaft 3 is secured a fly wheel 4 which, in the preferred form, also carries a system of gearing, best shown in Fig. 3, which can be clutched to the drive shaft 5, causing such shaft to rotate at variable speeds and in different directions. Drive shaft 5 can also be clutched directly to the fly wheel 4, causing the drive shaft to rotate at the same speed and in the same direction as the engine shaft 3. Drive shaft 5 may be provided with bearings in the car frame 1 at 7, and in the fly wheel 4 at 8, Fig. 4. Dove-tail grooves 9, Fig. 5, are formed on opposite sides of the drive-shaft 5, and in these grooves are placed slides 10 which are provided at one end with keys 11, Figs. 4 and 5, adapted for engagement with slots 12, formed in the fly wheel 4, causing drive shaft 5 to rotate with the fly wheel. A ring or flange 14 is carried by shaft 5, provided with slots or spaces 13 into which the keys 11 may be moved. If the keys 11 are moved from slots 12 to slots 13, it is evident that there will be no movement imparted to the drive shaft from engine shaft 3.

Mounted in the fly wheel 4 on opposite sides of its axis of rotation are shafts 15 carried in roller bearings 16. To each of the shafts 15 is secured a small gear wheel 17, in mesh with a much larger gear wheel 18 loose on drive shaft 5. Gear wheels 19, of larger diameter than gear wheels 17, are secured to shafts 15, and they are in mesh with a gear wheel 20 of larger diameter loose on drive shaft 5. Gear wheels 21 of larger diameter than gear wheels 19 are also secured to shaft 15, and they are in mesh with a gear wheel 22 of much smaller diameter loose on drive shaft 5. Finally, on shafts 15 are secured gear wheels 23, which are in mesh with a gear wheel 24 loose on drive shaft 5.

Gear wheel 24 is provided with a hub extension 25, the outer surface of which forms a bearing 26 for the fly wheel 4. To the outer end of the hub extension 25 is secured a friction disk 27, adapted for engagement through its left hand face with a stationary casting 28 forming part of bearing 7. The opposite face of the friction disk 27 is adapted for engagement with another friction disk 29, capable of movement to or from friction disk 27, but held from rotating by means of studs 30 (formed on disk 29), which project through holes 31 in the stationary casing 28. An oscillating collar 32, Fig. 3, is provided with a series of cam surfaces 33, which take against the studs 30, and cause movement of friction disk 29 to or from friction disk 27, causing the friction disk 27 to be held in or out of engagement with the stationary casing 28. Collar 32 is provided with a lever 34, by means of which an oscillating movement is imparted to the collar. Ball bearings 35, Fig. 3, are provided to facilitate the movement of the collar 32 against the resistance offered by the friction disk 27.

The highest speed of drive shaft 5 is caused by clutching directly to the fly wheel 4. In order to make adjustment for a lower speed, friction is applied to friction disk 27, by movement of oscillating collar 32, causing the disk 27, hub extension 25, and gear wheel 24 to remain stationary. Then as the engine shaft 3 and fly wheel 4 rotate in the direction indicated by the arrow, Fig. 5, gear wheels 23 will rotate in the same direction because of their engagement with stationary gear wheel 24. Rotation of gear wheels 23 will cause rotation of shafts 15 with all the gear wheels which are secured to it, together with the gear wheels in mesh therewith and loose on drive shaft 5. Then if the keys 11 be moved into slots 36, formed in gear wheel 18, drive shaft 5 will move as gear wheel 18 moves. The speed of gear wheel 18 is proportioned to the difference in the sizes of the gear wheels 17—18 and the gear wheels 23, 24. As the fly wheel 4 rotates, shaft 15 together with the gear wheels 17 and 23 are carried bodily in a circular path around the drive shaft 5. As the gear 23 is carried around the gear 24, it is caused to rotate on its axis. The gear 17 being fixed to the same shaft 15, will also be caused to rotate around gear wheel 18, and will cause the said gear 18 to rotate with a speed less than that of the engine shaft 3 and fly-wheel 4, by an amount proportioned to the ratio of the gears 17 and 18. If the keys 11 be moved into the circular channels 37 formed between the gear wheels 18 and 20, there will be no movement of the drive shaft 5, although the gear wheels may be rotating. Movement of the keys 11 into the slots 36 formed in gear wheel 20, causes drive shaft 5 to move as gear wheel 20 moves. The gear 19 being of larger diameter than gear 17, will therefore cause gear 20 to rotate more slowly than gear wheel 18, during its orbital travel.

Keys 11 can be moved into the circular channels 37 formed between the gear wheels 20 and 22, when no movement will be imparted to the drive shaft 5. Movement of keys 11 into slots 38 formed in gear wheel 22, causes drive shaft 5 to move as gear wheel 22 moves. The gear wheel 21 has a greater diameter than gear 23, and will cause the gear 22 to rotate in the reverse direction to the rotation of gear 21, during the orbital travel of gear 21. If keys 11 of slides 10 are in clutch with gear wheel 18, and the friction disk 29 thrown off, the resistance offered by drive shaft 5 to the rotation of gear wheel 18 will cause gear wheels 17 and shafts 15 and the remaining gear wheels to rotate during the rotation of the fly wheel 4, and as no resistance is offered by the friction disk 29 to the rotation of gear wheel 24, no movement will be imparted to the drive shaft 5. It will therefore be evident that when the friction disk 29 is thrown off, no power will be applied through the gearing to propel the drive shaft. If, however, keys 11 of slides 10 are in clutch with the fly wheel, and the friction disk 29 thrown off, all the gear wheels will be carried bodily around along with the drive shaft 5 during the rotation of the fly wheel. Or, if the friction disk 29 be thrown on, the gear wheels 18, 20, and 22 will be idly rotated by means of the gear wheels on shafts 15 during the rotation of the fly wheel. Friction disk 29 therefore will not interfere with the direct clutching of drive shaft 5 to the engine shaft 3.

In order that keys 11 may readily enter the slots formed in the fly wheel 4 and the gear wheels 18, 20, and 22, said parts are cut away on the sides of the slots which does not take against the keys 11 to turn the drive shaft 5. If, as shown in Figs. 4 and 5, the gear wheel 18 be rotating in the direction indicated by the arrow, face 39 of the slot 36 is made the full length of the slot in order that it may bear firmly against keys 11, but the opposite face 40 can be cut away at an inclination as shown at 41, so that the keys 11 on being moved against the incline 41 can ride along the incline and finally come to rest in the slot 36 and against the face 39. Evidently the incline 41 and the faces 39 and 40 can be formed to provide for movement of keys 11 in either direction, and the incline 41 and faces 39 and 40 can also be formed in a reverse direction to provide for proper engagement of the slots 38 of reversing gear wheel 22 with keys 11 of slides 10. The slides 10 are secured to a sliding collar 42, Fig. 3, having a circular groove 43 engaging with pins 44 on a lever 45 which may be connected to suitable controlling means.

As has been stated, in order to make adjustment for transmission of power other than by direct coupling to the engine shaft, it is also necessary to apply the friction clutch devices in order that the gear wheel 24 may be held stationary. The friction of disk 29 upon friction disk 27 can be applied with varying tension, causing gear wheel 24 to be more or less effective in transmitting power to drive shaft 5, thus providing for transmission of power to the drive shaft at speeds other than those described.

In the arrangement shown in Fig. 1 a fly wheel 46 is thrown into engagement with a shaft 47 by means of a friction clutch 48, actuated by means of a sliding cone 49 acting on levers 50. The details of this clutch are not shown as any well known form of friction clutch will serve the purpose. Sliding cone 49 has a circular groove engaging a lever 51 attached to a rock shaft 52 mounted in bearings on the car frame 1. To rock shaft 52 is secured an arm 53 which is connected by a rod 54 to a foot lever (not shown) for throwing the friction clutch 48 on or off. Shaft 47 rotates on roller bearings 55 in a casing 56, and has secured to it, a small gear wheel 57 in mesh with larger gear wheels 58 secured to shafts 59 mounted on roller bearings 60 in the casing 56. Shafts 59 have small gear wheels 60' in mesh with a larger gear wheel 61 rotating on drive shaft 5. To shafts 59 are also secured two gear wheels 62 smaller in diameter than gear wheels 60 and in mesh with a much larger gear wheel 63 rotating on drive shaft 5. Gear wheels 62 are also in mesh with intermediate gear wheels 64, mounted in the casing 56 and having a face broad enough to mesh with a gear wheel 65, rotating on drive shaft 5 alongside gear wheels 62 and 63. Casing 56 is capable of rotation upon roller bearings 66 on drive shaft 5, and in a stationary bearing 67 attached to the car frame 1. To the casing 56 is secured a friction disk 68 adapted for engagement with a stationary part of bearing 67. Friction is applied to disk 68 by means of a friction disk 69 controlled in a manner similar to that shown and described in Fig. 3.

Drive shaft 5, Fig. 1, can be clutched directly to shaft 47, by moving keys 11 of slide 10 into slots 70, and if the friction disk 69 is off, casing 56, together with the gearing will be rotated bodily with the drive shaft 5. In order to make adjustment for a lower speed, friction is applied to disk 68, by means of oscillating collar 32, causing the disk 68 and casing 56 to remain stationary. Then as the shaft 47, and gear 57, rotate in the direction indicated by the arrow, gears 58, 60', and 62, will rotate in the reverse direction and impart to gears 61 and 63, rotating on drive shaft 5, movement in the same direction as shaft 47, and at lower speeds on account of the difference in size of the gear wheels. Then if the keys 11 of slide 10 are moved into the slots 36 formed in gear 61, drive shaft 5 will move with said gear, but slower than gear 57 on account of the difference in size. Again, if keys 11 are moved into slots 36 of gear 63, drive shaft 5 will move therewith, but slower than when connected to gear 61. Now if keys 11 are moved into slots 36, of gear 65, the drive shaft 5 will be driven in the reverse direction from that above described, because said gear is in mesh with an intermediate gear 64, which in turn meshes with gear 62.

In the preferred mounting of the transmission gearing shown in Fig. 3, the gear wheels are at all times carried around in a circular path, and for that reason, can be mounted in the fly wheel of the engine, the gear wheels supplying the necessary weight, thus avoiding the use of the usual fly wheel.

In the two forms of my invention illustrated respectively, in Figs. 1 and 3, I have shown a special arrangement of interrelated gears. Manifestly, the arrangement of such gears may be altered, as has been shown by me in my prior patents, Nos. 864,903, 864,904, 864,905, and 864,906.

Having thus described my invention, I claim:—

1. In a motor vehicle, the combination with an engine shaft running continuously in one direction, a drive shaft for propelling the car, and means introduced between said shafts for propelling the car at any speed up to the maximum of that of the engine shaft or in either direction at the will of the operator, said means comprising a fly wheel driven with the engine shaft, a series of gears also rotating with the engine shaft, means for connecting one of said gears with the drive shaft, and means coöperating with the engine shaft for causing said gears to rotate on their axes.

2. In a motor car, the combination with an engine shaft running at a uniform speed and a drive shaft for propelling the car, of a fly wheel secured to the engine shaft, a series of gear wheels varying in diameter carried by said fly wheel, another series of gear wheels of varying diameter on the drive shaft in mesh with the first-mentioned gear wheels, means for causing rotation of the first mentioned series of gear wheels, and means whereby any one of the second series of gear wheels can be coupled to the drive shaft, whereby variable speeds can be imparted to the drive shaft from the engine shaft running at a uniform speed.

3. In a motor car, the combination with an engine shaft running continuously in one direction, and a drive shaft for propelling the car, of a fly wheel secured to the engine shaft, a series of gear wheels varying in diameter carried by said fly wheel, another series of gear wheels of varying diameter on the drive shaft in mesh with said first series of gear wheels, means for causing rotation of the first mentioned series of gear wheels, and means whereby any one of the second series of gear wheels can be coupled to the drive shaft, whereby the drive shaft can be rotated in different directions by means of the engine shaft which is running continuously in one direction, substantially as described.

4. In a motor car, the combination with a continuously running engine shaft, and a drive shaft for propelling the car, of a fly wheel secured to the engine shaft, gear wheels adapted for transmission of power to said drive shaft comprising gear wheels carried by said fly wheel, means coöperating with the engine shaft for causing rotation of said gear wheels and the rotation of the drive shaft thereby, means whereby the mechanism causing rotation of said gear wheels is made inoperative, and means for coupling the drive shaft direct to the engine shaft.

5. In a motor car, the combination with a continuously running engine shaft, and a drive shaft for propelling the car, of members interposed between the engine shaft and the drive shaft, which are adapted for transmission of power from the engine shaft to the drive shaft, and two clutching systems, one of said systems clutching certain of the interposed power transmission members to a stationary part of the car, the other system clutching others of the interposed power transmission members to the drive shaft, substantially as described.

6. In a motor car, the combination with a continuously running engine shaft, and a drive shaft for propelling the car, of power transmission members interposed between the engine shaft and the drive shaft, and two clutching systems, coöperating with the power transmission members and jointly necessary to render the power transmission members operative, one of said systems clutching one of the interposed power transmission members by means of a friction clutch to a stationary part of the car, the other system, clutching one of the interposed power transmission members to the drive shaft, and means for independently actuating said clutches whereby releasing of the friction clutch will stop the transmission of power to the drive shaft without disconnecting the power transmission members from the drive shaft.

7. In a motor car, the combination with a continuously running engine shaft, and a drive shaft for propelling the car, of a series of gear wheels of varying diameter interposed between the engine shaft and the drive shaft, and two clutching systems coöperating with the series of gear wheels, and jointly necessary to render the series of gear wheels operative to effect transmission of power from the engine shaft to the drive shaft, one of said systems clutching one of the series of gear wheels by means of a friction clutch to a stationary part of the car, the other system clutching any one of several of the series of gear wheels of varying diameter to the drive shaft, and means for independently actuating said clutches whereby adjustment can first be made by means of the last mentioned clutching system to clutch the drive shaft to a particular gear wheel, determining the speed at which the drive shaft shall run, after which the friction clutch can be applied to render the series of gear wheels operative, and effect the transmission of power from the engine shaft to the drive shaft.

8. In a motor car, the combination with a continuously running engine shaft and a drive shaft, for propelling the car, of a series of gear wheels of varying diameter interposed between the engine shaft and the drive shaft, and two clutching systems coöperating with the series of gear wheels and jointly necessary to render the series of gear wheels operative to effect transmission of power from the engine shaft to the drive shaft, one of said systems clutching the series of gear wheels by means of a friction clutch, to a stationary part of the car, the other system clutching any one of several of the series of gear wheels of varying diameter to the drive shaft, and means for independently actuating said clutches, whereby adjustment can first be made by means of the last mentioned clutching system to clutch the drive shaft to a particular gear wheel, determining the speed at which the drive shaft shall run, after which the friction clutch can be applied to render the series of gear wheels operative, and effect the transmission of power from the engine shaft to the drive shaft.

9. In a motor car, the combination with a continuously running engine shaft, and a drive shaft for propelling the car, of a series of gear wheels of varying diameter interposed between the engine shaft and the drive shaft, and two clutching systems coöperating with the series of gear wheels, and jointly necessary to render the series of gear wheels operative to effect transmission of power from the engine shaft to the drive shaft, one of said systems clutching one of the series of gear wheels by means of a friction clutch, to a stationary part of the car, the other system, clutching any one of several of the series of gear wheels of varying diameter to the drive shaft, and means for independently actuating said clutches; whereby adjustment can be made by means of the last mentioned clutching system to clutch the drive shaft to a particular gear wheel, determining the speed at which the drive shaft shall run, and the friction clutch applied with varying tension to effect the transmission of power to the drive shaft at different speeds without changing the clutch of the gear wheel to the drive shaft.

10. A motor car driving mechanism comprising a continuously running engine shaft, and a drive shaft for propelling the car, power transmission members interposed between the engine shaft and the drive shaft, two clutching systems for rendering the power transmission members operative, one of said systems clutching certain of the interposed power transmission members to a stationary part of the car, the other system clutching others of the interposed power transmission members to the drive shaft, and means whereby the last mentioned clutch can be shifted from said interposed power transmission members to direct engagement with the engine shaft.

11. A motor car driving mechanism comprising a continuously running engine shaft and a drive shaft for propelling the car, power transmission members interposed between the engine shaft and the drive shaft, two clutching systems for rendering the power transmission members operative, one of said systems clutching certain of the interposed power transmission members to a stationary part of the car, the other system clutching others of the interposed power transmission members to the drive shaft, a brake and means for applying the same to the drive shaft, and means coöperating with the first mentioned clutching system, whereby the application of the brake automatically stops the transmission of power to the drive shaft, without disconnecting the last mentioned clutch from said interposed power transmission members.

12. A motor car driving mechanism comprising a continuously running engine shaft, and a drive shaft for propelling the car, members interposed between the engine shaft and the drive shaft, two clutching systems for rendering the power transmission members operative, one of said systems clutching certain of the interposed power transmission members to a stationary part of the car, the other system clutching others of the interposed power transmission members to the drive shaft, means whereby the last mentioned clutch can be shifted from said interposed power transmission members to direct engagement with the engine shaft, a brake and means for applying the same to the drive shaft, and means coöperating with the two clutching systems whereby the application of the brake automatically stops transmission of power to the drive shaft, either by the interposed power transmission members or by the direct clutching to the engine shaft.

13. In a motor car, the combination with a continuously running engine shaft, and a drive shaft for propelling the car, of members interposed between the engine shaft and the drive shaft, two clutching systems for rendering the power transmission members operative, one of said systems clutching certain of the interposed power transmission members to a stationary part of the car, the other system clutching the drive shaft either to certain of the interposed power transmission members or to the engine shaft.

14. A motor car driving mechanism comprising a continuously running engine shaft and a drive shaft for propelling the car, members interposed between the engine shaft and the drive shaft, two clutching systems for rendering the power transmission members operative, one of said systems clutching certain of the interposed power transmission members to a stationary part of the car, the other system clutching the drive shaft either to certain of the interposed power transmission members or to the engine shaft, means for applying a brake to the drive shaft, and means coöperating with the two clutching systems whereby the application of the brake automatically stops transmission of power to the drive shaft, either by the interposed power transmission members or by the direct clutching to the engine shaft.

15. A motor car driving mechanism comprising an engine shaft running at a uniform speed and a drive shaft for propelling the car, a fly wheel secured to the engine shaft, a shaft carried thereby, a series of gear wheels varying in diameter secured to said shaft, a corresponding series of gear wheels of varying diameter on the drive shaft in mesh with said first mentioned series, and means for clutching any one of the last mentioned series of gear wheels to the drive shaft, a gear wheel held stationary and in mesh with a gear wheel secured to the shaft mounted on the fly wheel whereby revolution of the fly wheel causes rotation of the gear wheels secured to the shaft mounted on the fly wheel, certain of the gear wheels secured to the shaft on the fly wheel, of less diameter than the gear wheel causing their rotation, being in mesh with larger gear wheels on the drive shaft, whereby the last mentioned gear wheel is rotated in the same direction as the fly wheel, but at a speed less than the fly wheel, proportioned to the difference between the forward movement caused by the fly wheel and the backward movement caused by the gear wheels secured to the shaft on the fly wheel.

16. A motor car driving mechanism comprising an engine shaft running in one direction at a uniform speed and a drive shaft for propelling the car, a fly wheel secured to the engine shaft, a shaft carried thereby, a series of gear wheels varying in diameter secured to said shaft, a corresponding series of gear wheels of varying diameter on the drive shaft in mesh with the first mentioned series, and means for clutching one of the last mentioned series of gear wheels to the drive shaft, a gear wheel that is held stationary, in mesh with a gear wheel secured to the shaft mounted on the fly wheel, whereby revolution of the fly wheel causes rotation of the gear wheels, secured to the shaft mounted on the fly wheel, one of the gear wheels secured to the shaft on the fly wheel, of greater diameter than the gear wheel causing its rotation, being in mesh with a smaller gear wheel on the drive shaft, whereby the last mentioned gear wheel is rotated in a reverse direction from the fly wheel owing to the difference between the forward movement caused by the fly wheel, and the greater backward movement caused by the gear wheels secured to the shaft on the fly wheel.

17. A motor car driving mechanism comprising an engine shaft running in one direction at a uniform speed, and a drive shaft for propelling the car, a fly wheel secured to the engine shaft, a shaft carried thereby, a series of gear wheels varying in diameter secured to said shaft, a corresponding series of gear wheels of varying diameter on the drive shaft and in mesh with said first-mentioned series, and means for clutching any one of the last mentioned series of gear wheels to the drive shaft, a stationary gear wheel in mesh with a gear wheel secured to the shaft mounted on the fly wheel, whereby revolution of the fly wheel causes rotation of the gear wheels secured to the shaft mounted on the fly wheel, certain of the large gear wheels on the drive shaft being in mesh with gear wheels secured to the shaft on the fly wheel of less diameter than the gear wheel causing their rotation, whereby the large gears on the drive shaft rotate in the same direction as the fly wheel, and a small gear wheel on the drive shaft which is in mesh with a gear wheel secured to the shaft on the fly wheel of greater diameter than the gear wheel causing its rotation, whereby the small gear wheel on the drive shaft is rotated in a reverse direction from the fly wheel.

18. In a motor car, the combination with the engine shaft and the drive shaft, of variable speed transmitting mechanism introduced between the two, said mechanism comprising a fly wheel, speed gears, means coöperating with the engine shaft for causing certain of said speed gears to rotate on their axes, and means for coupling others of the speed gears to the drive shaft.

19. In a motor car, the combination with an engine shaft and the drive shaft, of variable speed mechanism introduced between the two, said speed mechanism comprising a constantly rotated fly wheel, a series of gears rotated in unison with the fly wheel, another series of gear wheels on the drive shaft, and means for engaging any one of said last-mentioned gear wheels with the drive shaft, and means coöperating with the engine shaft for causing the first-mentioned series of gear wheels to have a relative motion as regards each other.

20. In a motor car, the combination with the engine shaft and the drive shaft, a variable speed mechanism comprising changeable gears introduced between the two, means for throwing the speed mechanism into connection with the drive shaft, said means consisting of sliding keys, and means coöperating with the engine shaft for causing the rotation of said gears upon their axes, said means consisting of a clutch mechanism.

21. In a motor vehicle, a power transmission device, comprising an engine shaft, a drive shaft, a variable speed mechanism, comprising changeable gears, introduced between said shafts, means for throwing the speed mechanism into connection with the drive shaft, and means comprising a friction clutch coöperating with the engine shaft for causing said gears to rotate on their axes, whereby the speed imparted to the driving wheels is the component of the following factors, first, the speed of rotation of the variable speed mechanisms as a whole; second, the speed of rotation of the individual gears about their axes; third, the speed of rotation of the last driving gear, and fourth, the speed of rotation of the drive shaft.

22. In an automobile transmission mechanism, the combination with a fly-wheel, of a plurality of sets of planetary gears of different diameters held to the fly-wheel, a transmission shaft rotatably held in the fly-wheel, a plurality of gears held to rotate with the transmission shaft as an axis and meshing with the planetary gears, means for locking certain of the gears to the transmission shaft, together with means for imparting a rotary movement to the sets of gears on their own axis as they move with the fly-wheel.

23. In an automobile transmission mechanism, the combination with a fly wheel, of a plurality of planetary gears of different diameters held to the fly-wheel, a transmission shaft rotatably held in the fly-wheel, a plurality of independent gears held to rotate with the transmission shaft as an axis and meshing with the planetary gears, means for locking certain of the gears to the transmission shaft, together with means for imparting a rotary movement to the planetary gears on their own axis as they move with the fly-wheel.

24. In an automobile transmission mechanism, the combination with a fly-wheel, of a plurality of sets of planetary gears of relatively different diameters held to the fly-wheel a transmission shaft rotatably supported in the fly-wheel, a plurality of gears of different diameters held to rotate with transmission shaft as an axis and meshing with the planetary gears, movable keys for locking certain of the gears to the transmission shaft, together with means for imparting a rotary movement to the planetary sets of gears on their own axis as they move with the fly-wheel.

25. The combination with a transmission shaft and means for supporting the same, of a plurality of gears held to rotate independently of the transmission shaft with the latter as an axis, a plurality of planetary gears meshing with the gears on the transmission shaft, and means for locking certain of the rotary gears to the transmission shaft, together with means for causing the planetary gears to rotate on their own axis.

26. The combination with a fly-wheel forming a casing, of a shaft adapted to rotate independent of the fly-wheel, a plurality of gears, means for locking said gears to rotate with the shaft, a plurality of planetary gears journaled within the fly-wheel and adapted to impart motion to the first-mentioned gears, and means for rotating the planetary gears on their axis.

27. The combination with a hollow fly-wheel and a shaft for rotating said wheel, of a transmission shaft axially arranged with respect to the fly-wheel shaft, a cap piece secured to the fly-wheel and forming an inclosed casing, a plurality of gears rotatably held on the transmission shaft, means for locking the gears to the shaft, a plurality of planetary gears journaled in the fly-wheel for rotating the gears on the transmission shaft, and means for controlling said planetary gears on their axis.

28. The combination with a transmission shaft, of a plurality of gears rotatably held on said shaft, a movable key for locking the gears to the shaft, a plurality of planetary gears for rotating the gears on the transmission shaft, and means for controlling said planetary gears on their axis.

29. The combination with a transmission shaft, of a plurality of gears rotatably held on said shaft, means for locking the gears to the shaft, a plurality of planetary gears for rotating the gears on the transmission shaft, means for rotating the planetary gears on their own axis, and a clutch whereby all the parts may be made to rotate in unison.

30. The combination with a transmission shaft, of a plurality of gears of relatively different diameters independently rotatable on said shaft, a device slidingly held on the shaft to move lengthwise thereof and adapted to lock certain of said gears to the transmission shaft, a plurality of planetary gears of relatively different diameters in mesh with the gears having the transmission shaft as an axis, and means for imparting a rotary movement to the planetary gears.

31. The combination with a transmission shaft, and means for supporting the same, of a set of four gears arranged with the transmission shaft as an axis and having relatively different diameters and arranged to rotate independently of said shaft, keys slidingly held on the shaft and adapted to engage and lock certain of said gears to the shaft, a plurality of planetary gears of relatively different diameters held to rotate in unison and meshing with the gears on the transmission shaft, and means for holding one of the gears on the transmission shaft stationary so as to impart an independent rotary movement to the planetary gears as they move around the transmission shaft.

32. The combination with a transmission shaft and means for supporting the same, of a set of gears arranged with the transmission shaft as an axis and having different diameters and arranged to rotate independently of said shaft, means held on the shaft and adapted to engage and lock certain of said gears to the shaft, a plurality of planetary gears of relatively different diameters held to rotate in unison and meshing with the gears on the transmission shaft, the gears being so proportioned that one of the planetary gears will reverse the direction of rotation of one of the gears on the transmission shaft, and means for holding one of the gears on the transmission shaft stationary so as to impart an independent rotary movement to the planetary gears as they move around the transmission shaft.

33. A transmission mechanism comprising a shaft, a set of gears of different diameters arranged to rotate independent of the transmission shaft and having the latter as an axis, certain of said gears having a slot and an annular groove therein, keys slidingly held in the transmission shaft and having projecting ends adapted to enter the slots of the gears to lock the same to the shaft one at a time or to be alined with the grooves to release said gears, planetary gears of different diameters in mesh with the gears on the transmission shaft, and means coöperating with one of said independently rotatable gears for controlling the planetary gears on their axis.

34. A transmission mechanism comprising a shaft, a set of four gears of different diameters arranged to rotate independent of the transmission shaft and having the latter as an axis, certain of said gears having a slot and an annular groove therein, means slidingly held to the transmission shaft and adapted to enter the slots of the gears to lock the same to the shaft one at a time or to be alined with the grooves to release said gears, two sets of planetary gears of different diameters in mesh with the gears on the transmission shaft and arranged on opposite sides of said shaft, and means coöperating with one of said independently rotatable gears for controlling the planetary gears on their axis.

35. The combination with a fly-wheel having a cap forming an inclosing casing, of a transmission shaft held to rotate in the casing, a set of four gears of different diameters arranged to rotate independent of the transmission shaft and having the latter as an axis, certain of said gears having a slot and an annular groove therein, keys slidingly held in the transmission shaft and having projecting ends adapted to enter the slots of the gears to lock the same to the shaft one at a time or to be alined with the grooves to release said gears, two sets of planetary gears each comprising four gears of different diameters in mesh with the gears on the transmission shaft and arranged on opposite sides of said shaft, and means coöperating with one of said independently rotatable gears for controlling the planetary gears on their axis.

36. The combination with a fly-wheel forming a casing of transmission gears of relatively different diameters arranged in said casing, a transmission shaft adapted to be operatively connected with the gears to rotate with said gears or the latter to rotate independent of said shaft, and means for rotating the shaft and gears in unison.

37. In an automobile transmission mechanism, the combination with a fly-wheel, a plurality of planetary gears held to fly-wheel, a transmission shaft rotat: held in the fly-wheel, a plurality of g arranged on the transmission shaft and erated by the planetary gears, and m( for locking certain of the gears to the tr: mission shaft.

38. In an automobile transmission me anism, the combination with a fly-wheel a plurality of sets of planetary gears of ferent diameters held to the fly-wheel a r( table transmission shaft, a plurality of g( of different diameters arranged on the tr: mission shaft and directly in mesh with planetary gears, and means for locking gears to the transmission shaft.

39. The combination with a transmiss shaft, of a plurality of gears rotatably h on said shaft, means for locking the gear: the shaft, and a plurality of planetary ge for rotating the gears on the transmiss shaft.

40. The combination with a transmiss shaft, of a plurality of gears rotatable w said shaft, means for locking the gears to shaft, and a plurality of planetary gears mesh with the gears on the transmiss: shaft.

In testimony whereof, I affix my sig1 ture, in the presence of two witnesses.

ARTHUR JACOB MORSE

Witnesses:
FREDERICK A. BLOUNT,
ELIZABETH BARNETT.